United States Patent
McNeil et al.

(10) Patent No.: US 9,506,756 B2
(45) Date of Patent: Nov. 29, 2016

(54) MULTIPLE AXIS RATE SENSOR

(71) Applicant: FREESCALE SEMICONDUCTOR, INC., Austin, TX (US)

(72) Inventors: Andrew C. McNeil, Chandler, AZ (US); Yizhen Lin, Cohoes, NY (US)

(73) Assignee: Freescale Semiconductor, Inc., Austin, TX (US)

(*) Notice: Subject to any disclaimer, the term of this patent is extended or adjusted under 35 U.S.C. 154(b) by 769 days.

(21) Appl. No.: 13/833,290

(22) Filed: Mar. 15, 2013

(65) Prior Publication Data

US 2014/0260610 A1 Sep. 18, 2014

(51) Int. Cl.
G01C 19/00 (2013.01)
G01C 19/5712 (2012.01)

(52) U.S. Cl.
CPC ................................. *G01C 19/5712* (2013.01)

(58) Field of Classification Search
CPC .................................................. G01C 19/5712
See application file for complete search history.

(56) References Cited

U.S. PATENT DOCUMENTS

| | | | | |
|---|---|---|---|---|
| 6,837,107 B2* | 1/2005 | Geen | ................... | G01C 19/5712 73/504.04 |
| 6,859,751 B2* | 2/2005 | Cardarelli | .......... | G01C 19/5719 702/141 |
| 7,168,317 B2* | 1/2007 | Chen | ................... | G01C 19/5719 73/504.04 |
| 7,284,429 B2* | 10/2007 | Chaumet | ............ | G01C 19/5747 73/504.12 |
| 7,461,552 B2 | 12/2008 | Acar | | |
| 8,261,614 B2* | 9/2012 | Hartmann | .......... | G01C 19/5712 73/504.12 |
| 8,904,866 B2* | 12/2014 | Hammer | ............ | G01C 19/5712 73/504.04 |
| 9,109,893 B2* | 8/2015 | Heller | ..................... | G01C 19/56 73/504.12 |
| 9,151,611 B2* | 10/2015 | Coronato | ................ | G01C 19/42 73/504.12 |
| 2010/0139399 A1* | 6/2010 | Geiger | .................. | G01C 19/574 73/504.12 |
| 2012/0024056 A1* | 2/2012 | Hammer | ............ | G01C 19/5712 73/504.02 |
| 2012/0055248 A1* | 3/2012 | Hammer | ............ | G01C 19/5712 73/504.12 |
| 2012/0060604 A1* | 3/2012 | Neul | ..................... | G01C 19/574 73/504.12 |

* cited by examiner

*Primary Examiner* — Laura Martin
*Assistant Examiner* — Samir M Shah
(74) *Attorney, Agent, or Firm* — Charlene R. Jacobsen

(57) ABSTRACT

A microelectromechanical systems (MEMS) device includes at least two rate sensors (20, 50) suspended above a substrate (30), and configured to oscillate parallel to a surface (40) of the substrate (30). Drive elements (156, 158) in communication with at least one of the rate sensors (20, 50) provide a drive signal (168) exhibiting a drive frequency. One or more coupling spring structures (80, 92, 104, 120) interconnect the rate sensors (20, 50). The coupling spring structures enable oscillation of the rate sensors (20, 50) in a drive direction dictated by the coupling spring structures. The drive direction for the rate sensors (20) is a rotational drive direction (43) associated with a first axis (28), and the drive direction for the rate sensors (50) is a translational drive direction (64) associated with a second axis (24, 26) that is perpendicular to the first axis (28).

17 Claims, 7 Drawing Sheets

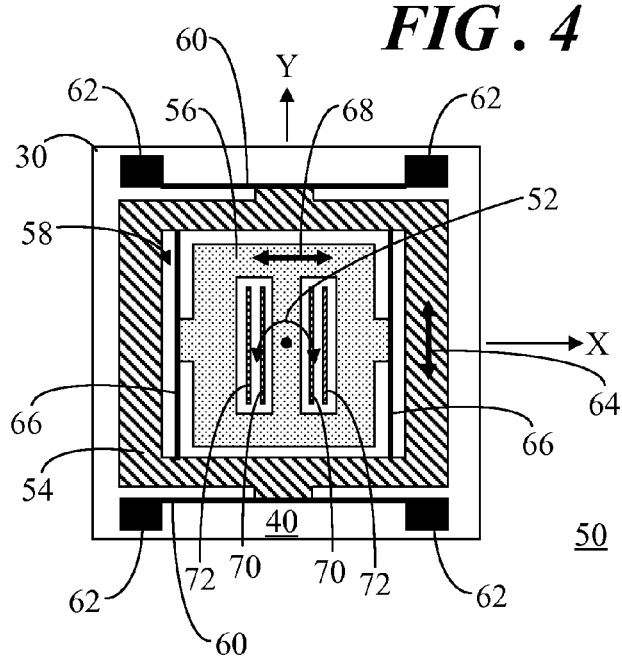
*FIG. 4*
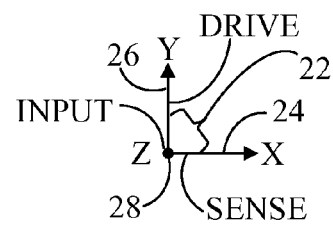
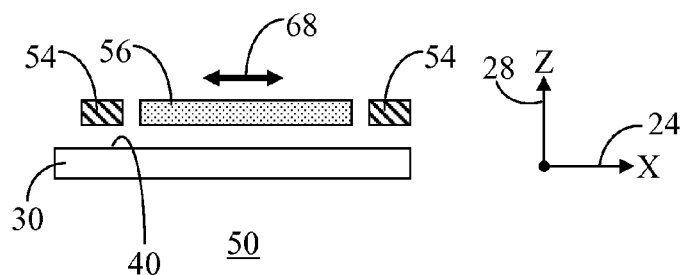
*FIG. 5*
*FIG. 6*
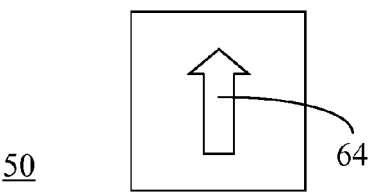

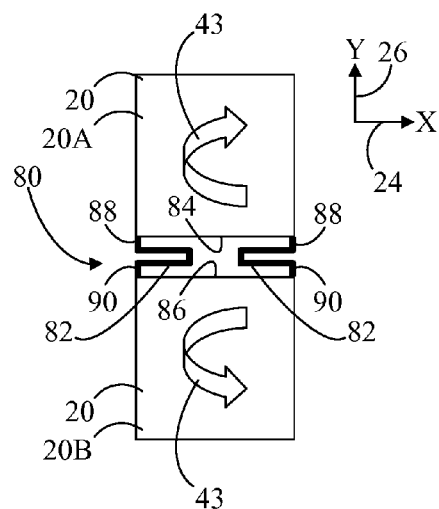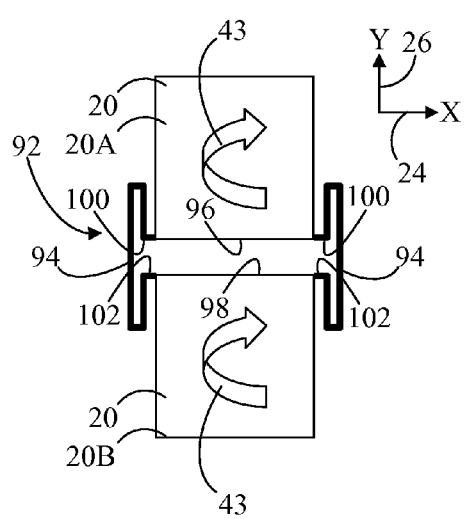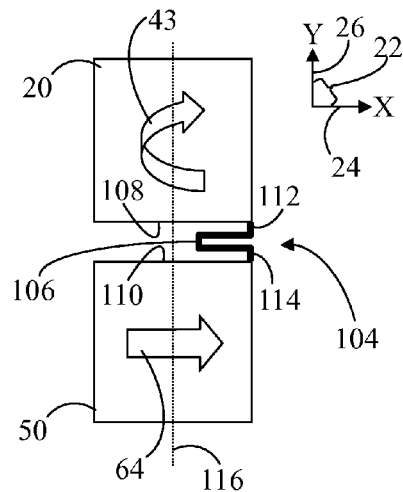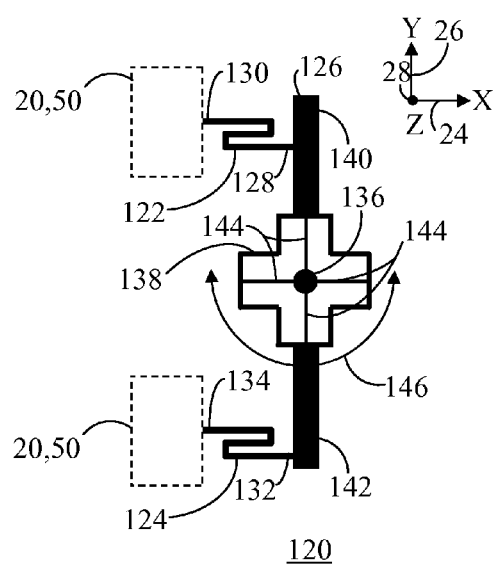

MULTIPLE AXIS RATE SENSOR

TECHNICAL FIELD OF THE INVENTION

The present invention relates generally to rate sensors. More specifically, the present invention relates to a microelectromechanical systems (MEMS) device for sensing angular motion about at least two axes.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensor devices are widely used in applications such as automotive, inertial guidance systems, household appliances, game devices, protection systems for a variety of devices, and many other industrial, scientific, and engineering systems. One example of a MEMS sensor is a MEMS angular rate sensor, also referred to as a gyroscope. An angular rate sensor senses angular speed or velocity around one or more axes.

BRIEF DESCRIPTION OF THE DRAWINGS

A more complete understanding of the present invention may be derived by referring to the detailed description and claims when considered in connection with the Figures (not necessarily drawn to scale), wherein like reference numbers refer to similar items throughout the Figures, and:

FIG. 4 shows a top view of another exemplary rate sensor assembly;

FIG. 5 shows a side view of the rate sensor assembly of FIG. 4;

FIG. 6 shows a symbolic representation of the rate sensor assembly of FIG. 4;

FIG. 7 shows a coupling spring structure for coupling a pair of rate sensor assemblies in accordance with an embodiment;

FIG. 8 shows another coupling spring structure for coupling a pair of rate sensor assemblies in accordance with an embodiment;

FIG. 9 shows another coupling spring structure for coupling a pair of rate sensor assemblies in accordance with an embodiment;

FIG. 10 shows yet another coupling spring structure for coupling a pair of rate sensor assemblies in accordance with an embodiment;

DETAILED DESCRIPTION

Figure 1:
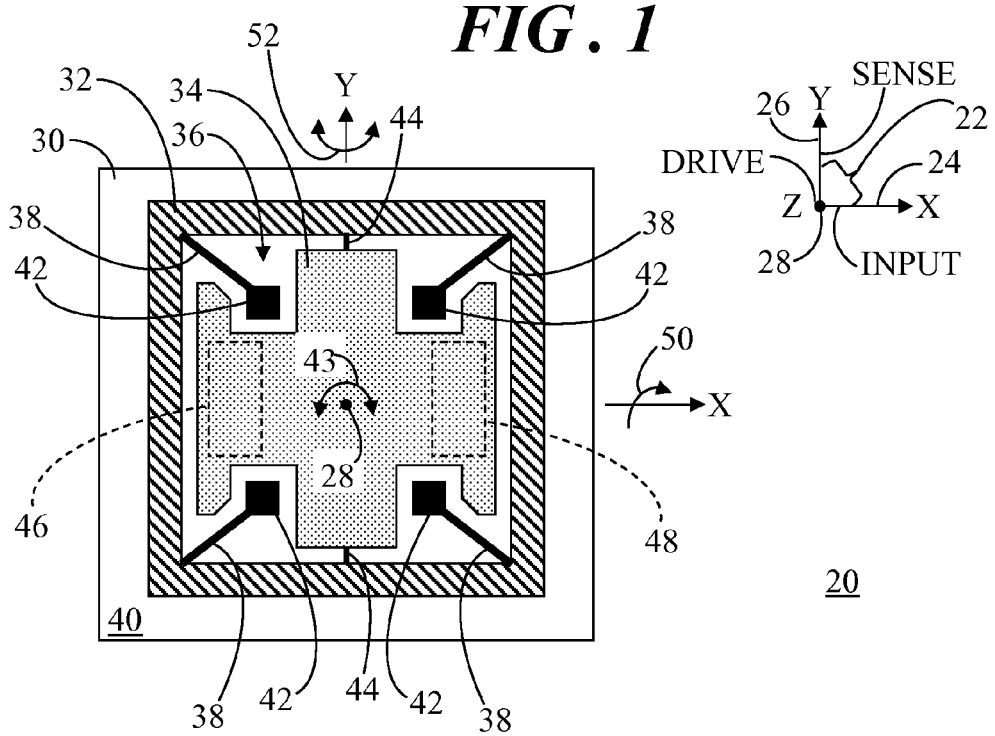
FIG. 1 shows a top view of an exemplary rate sensor assembly.

Angular rate sensors broadly function by driving the sensor into a first motion and measuring a second motion of the sensor that is responsive to both the first motion and the angular velocity to be sensed. Capacitive-sensing MEMS device designs for angular rate sensors are highly desirable for operation in miniaturized devices due to their low temperature sensitivity, small size, and suitability for low cost mass production.

As the uses for MEMS angular rate sensors continue to grow and diversify, increasing emphasis is being placed on the development of devices capable of sensing angular rate about multiple axes of rotation. In addition, increasing emphasis is being placed on fabrication methodology for MEMS angular rate sensors that achieves multiple axis sensing capability without increasing manufacturing cost and complexity and without sacrificing part performance. These efforts are primarily driven by existing and potential high-volume applications in automotive, medical, commercial, and consumer products.

Typical multiple axis rate sensing configurations may include two or more separate rate sensors on the same substrate, oriented in an orthogonal configuration. Such a multiple axis MEMS device may require multiple sets of drive and monitor electrodes, where each set of drive and monitor electrodes is associated with one of the angular rate sensors. Furthermore, such a configuration may call for an application specific integrated circuit (ASIC) having multiple frequency generators, where each frequency generator is associated with one of the angular rate sensors so that each rate sensor is driven at a different frequency. The frequencies of the drive signals being provided to the rate sensors from the multiple frequency generators should be spaced far enough apart so that they do not coincide with one another due to process variation. Accordingly, a MEMS die having separate rate sensors and the associated ASIC having multiple frequency generators may be undesirably large, complex, and costly.

Embodiments entail MEMS device structures that include multiple individual rate sensor assemblies for multiple axis sensing. The rate sensor assemblies are linked together via coupling spring structures, where the configurations of coupling spring structures dictate a drive direction for each of the rate sensor assemblies. Additionally, each of the rate sensor assemblies are driven into oscillation at the same drive frequency. Since the rate sensor assemblies are driven into oscillation at the same drive frequency, there is a need for their motion to be synchronized. That is, if the drive masses of the rate sensor assemblies are not mechanically synchronized, the drive signals might have a different phase and drive amplitude which could result in sense signal inaccuracy. Accordingly, the coupling spring structures enable the rate sensor assemblies to oscillate at the same drive frequency with synchronized motion to enable common demodulation in an associated ASIC.

Figure 2:
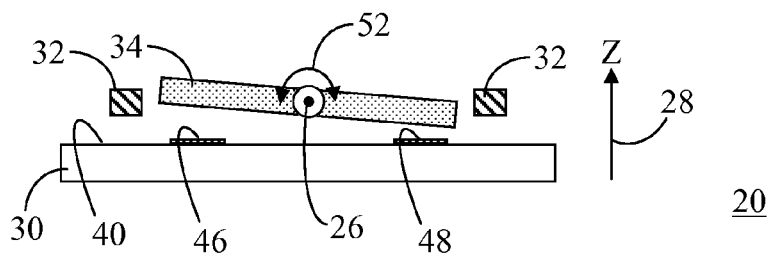
FIG. 2 shows a side view of the rate sensor assembly of FIG. 1.
Figure 3:
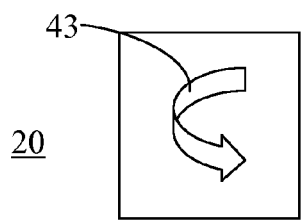
FIG. 3 shows a symbolic representation of the rate sensor assembly of FIG. 1.

As will be discussed in greater detail below, FIGS. 1-3 are provided to illustrate an example rate sensor assembly for sensing rotation about an in-plane axis that may be incorporated in the various example multiple axis rate sensor embodiments discussed in connection with FIGS. 11-16. Likewise, FIGS. 4-6 are provided to illustrate another example rate sensor assembly for sensing in-plane rotation that may also be incorporated in various example multiple axis rate sensor embodiments discussed in connection with FIGS. 11-16. Although, two rate sensor assemblies are shown herein, it should be understood that embodiments are not limited to these particular rate sensor designs. Rather, embodiments entail the inclusion of a multiplicity of rate sensor designs, each of which may be optimized to sense a particular angular input. The multiple rate sensors are suitably linked via coupling spring structures (described herein) that dictate their drive direction.

Referring now to FIGS. 1-3, FIG. 1 shows a top view of an example rate sensor assembly 20, FIG. 2 shows a side view of rate sensor assembly 20, and FIG. 3 shows a symbolic representation of rate sensor assembly 20. By convention, angular rate sensor 20 is illustrated as having a generally planar structure within an X-Y plane 22, wherein an X-axis 24 and a Y-axis 26 in a three-dimensional coordinate system are parallel to X-Y plane 22, and a Z-axis 28 extends out of the page, normal to X-Y plane 22 in FIG. 1. In this example, rate sensor assembly 20 is generally configured to sense angular rate occurring about an input axis which in this example is X-axis 24. However, this design may be readily implemented to sense angular rate occurring about another input axis, namely Y-axis 26, by orienting it orthogonal to the illustrated configuration.

Rate sensor assembly 20 includes a substrate 30, a suspended mass, referred to herein as a drive mass 32, another suspended mass, referred to herein as a sense mass 34, and various mechanical linkages which will be described in detail below. In the example of FIG. 1, sense mass 34 resides in a central opening 36 extending through drive mass 32. This configuration is sometimes referred to as an "outside drive, inside sense" sensor design.

Flexible support elements in the form of torsion springs 38 are coupled to an inner perimeter of drive mass 32. Torsion springs 38 connect drive mass 32 to a planar surface 40 of substrate 30 via anchors 42 which also reside within central opening 36 so that drive mass 32 is suspended above substrate 30. Torsion springs 38 are flexible primarily in X-Y plane 22 so that drive mass 32 is largely constrained for in-plane oscillatory torsional rotation about Z-axis 28. That is, a drive direction of drive mass 32 is associated with Z-axis 28. The oscillatory rotational drive motion is represented by a curved arrow 43 (FIGS. 1 and 3), and is referred to herein as rotational drive direction 43. Sense mass 34 is suspended above substrate 30 by torsion beams 44 which couple to the inner perimeter of drive mass 32. Torsion beams 44 extend parallel to Y-axis 26 and constrain sense mass 34 for out-of-plane rotation about Y-axis 26. Again, this design may be implemented to sense angular rate occurring about Y-axis 26, by orienting it such that torsion beams 44 extend parallel to X-axis 24 and constrain sense mass 34 for out-of-plane rotation about X-axis 24.

The elements of rate sensor assembly 20 and other example embodiments (discussed below) are variously described as being "anchored to," "attached to," "attached with," "coupled to," "connected to," or "interconnected with," other elements of rate sensor assembly 20. It should be understood that the terms refer to the direct or indirect physical connections of particular elements of rate sensor assembly 20 that occur during their formation through patterning and etching processes of MEMS fabrication. Additionally, the various elements of rate sensor assembly 20 and other example embodiments (discussed below) may be produced utilizing current and upcoming surface micromachining techniques of depositing, patterning, etching, and so forth. Accordingly, although different shading and/or hatching may be utilized in the illustrations, the different elements within the structural layers are typically formed out of the same material, such as polysilicon, single crystal silicon, and the like.

A variety of conductive plates, or electrodes, may be formed on surface 40 of substrate 30 in conjunction with the other fixed components of rate sensor assembly 20. In this simplified illustration, the electrodes include sense electrodes 46 and 48 which are used to sense the rotation of rate sensor assembly 20 about the input axis, i.e., X-axis 24. Conductors (not shown) can be formed on substrate 30 to provide separate electrical connections from the ASIC to electrodes 46 and 48 and to sense mass 32. The rotation may be sensed as changes in capacitances between sense mass 32 and electrodes 46 and 48 in order to monitor the out-of-plane movement of sense mass 32. Electrodes 46 and 48 are obscured in FIG. 1 by the overlying sense mass 34. Accordingly, in FIG. 1, electrodes 46 and 48 are represented in dashed line form to illustrate their physical placement relative to sense mass 34.

Per convention, rate sensor assembly 20 may include a drive actuation unit (not shown) having fixed parallel plate actuators interleaved with electrode plates affixed to drive mass 32. In general, an alternating current (AC) drive signal may be applied to the parallel plate actuators via an ASIC, i.e., a drive circuit (not shown). The drive signal causes drive mass 32 to oscillate about Z-axis 28 within X-Y plane 22, as represented by rotational drive direction 43. When rate sensor assembly 20 is subjected to an input, i.e., an angular movement (represented by an arrow 50 in FIG. 1) about X-axis 24, the Coriolis force produced by angular movement 50 causes sense mass 34 to rotate about Y-axis 26 (represented by an arrow 52 in FIGS. 1 and 2), and is referred to hereinafter as sense motion 52. The out-of-plane sense motion 52 of sense mass 34 about Y-axis 26, and hence the rotation of rate sensor assembly 20 about the input axis, i.e., X-axis 24, is detected by sensing the capacitance at electrodes 46 and 48, as known to those skilled in the art.

The symbolic representation of rate sensor assembly 20 shown in FIG. 3 represents a rate sensor assembly in which the drive mass is driven into oscillatory rotational motion about Z-axis 28. The curved arrow shown in the symbolic representation of rate sensor assembly 20 represents oscillatory rotational drive direction 43. As discussed above, the sense mass of rate sensor assembly 20 is configured to sense angular rate about X-axis 24 or about Y-axis 26 via a Coriolis force, as discussed above. Accordingly, rate sensor assembly 20 will be referred to hereinafter as X-Y sensor assembly 20. It bears repeating that X-Y sensor assembly 20 represents any of a variety of rate sensor designs, each of which may be optimized to sense angular rate occurring about either of X-axis 24 or Y-axis 26 while being driven in rotational drive direction 43. The arrow 43 shown in FIG. 3 represents the oscillatory rotation drive motion about Z-axis 28, regardless of whether angular rate sensor 20 is being used to sense an input angular rate about X-axis 24 or Y-axis 26.

Referring now to FIGS. 4-6, FIG. 4 shows a top view of another example rate sensor assembly 50, FIG. 5 shows a side view of rate sensor assembly 50, and FIG. 6 shows a symbolic representation of rate sensor assembly 50. Like rate sensor assembly 20 (FIG. 1), rate sensor assembly 50 is illustrated as having a generally planar structure within X-Y plane 22. In this example, rate sensor assembly 50 is generally configured to sense angular movement, represented by a curved arrow 52, about an input axis that is perpendicular to X-Y plane 22, i.e., Z-axis 28.

Rate sensor assembly 50 includes a drive mass 54 and a sense mass 56 in spaced apart relationship with, i.e., suspended above, substrate 30. In the example of FIG. 4, sense mass 56 resides in a central opening 58 extending through drive mass 54. Like rate sensor assembly 20, this configuration is also sometimes referred to as an "outside drive, inside sense" sensor design.

In an embodiment, flexible support elements 60 are coupled to an outer perimeter of drive mass 54. Flexible support elements 60 connect drive mass 54 to planar surface 40 of substrate 30 via anchors 62 so that drive mass 54 is suspended above substrate 30. Flexible support elements 60 are lengthwise oriented substantially parallel to X-axis 24. Flexible support elements 60 are flexible, i.e., compliant, primarily in a Y-direction so that drive mass 54 is largely constrained for in-plane translational motion parallel to Y-axis 26. That is, a drive direction of drive mass 54 is associated with Y-axis 26. The oscillatory translational drive motion is represented by a straight arrow 64 (FIGS. 4 and 6) oriented parallel to Y-axis 26, and is referred to herein as translational drive direction 64. As used herein the phrase "translational drive motion" refers to uniform drive movement without rotation.

Sense mass 56 is suspended above substrate 30 by flexible support elements 66 which couple to an inner perimeter of drive mass 54. Flexible support elements 66 are lengthwise oriented substantially parallel to Y-axis 26. Flexible support elements 66 are flexible, i.e., compliant, primarily in an X-direction so that sense mass 56 is largely constrained for in-plane oscillatory translational motion parallel to X-axis 24. This translational sense direction is represented by a bi-directional arrow 68 (FIGS. 4 and 5) oriented parallel to X-axis 24, and is referred to herein as sense motion 68.

As known to those skilled in the art, a variety of fixed electrodes may be formed, mounted to surface 40 of substrate 30 and at the same level as sense mass 56 in conjunction with the other fixed components of rate sensor assembly 50. In this simplified illustration, the electrodes include sense electrodes 70 and 72, used to sense the rotation of rate sensor assembly 50 about the input axis, i.e., Z-axis 28. In particular, sense electrodes 70 and 72 sense translational motion of sense mass 56 because this motion causes the capacitance between sense mass 56 and fixed sense electrodes 70 and 72 to change. Accordingly, the rotation of rate sensor assembly 50 about the input axis, i.e., Z-axis 28 may be sensed as a change in capacitances between sense mass 56 and electrodes 70 and 72. Conductors (not shown) can be formed on substrate 30 to provide separate electrical connections from the ASIC to electrodes 70 and 72 and to sense mass 56.

Per convention, rate sensor assembly 50 may include a drive actuation unit (not shown) having fixed parallel plate actuators suitably arranged with electrode plates affixed to drive mass 54. In general, an alternating current (AC) drive signal may be applied to the parallel plate actuators via an ASIC, i.e., a drive circuit (not shown). The drive signal causes drive mass 54 to oscillate parallel to Y-axis 26 within X-Y plane 22, as represented by translational drive direction 64. When rate sensor assembly 50 is subjected to an input, i.e., angular movement 52 about Z-axis 28, the Coriolis force produced by angular movement 52 causes sense mass 56 to translate substantially parallel to X-axis 24 (represented by an arrow 68 in FIGS. 4 and 5), which is referred to hereinafter as sense motion 68. The in-plane sense motion 68 of sense mass 56 parallel to X-axis 24, and hence the rotation of rate sensor assembly 50 about the input axis, i.e., Z-axis 28, is detected by sensing the capacitance at electrodes 70 and 72, as known to those skilled in the art.

The symbolic representation of rate sensor assembly 50 shown in FIG. 6 represents a rate sensor assembly in which the drive mass is driven into oscillatory translational motion parallel to one of X-axis 24 and Y-axis 26. The straight arrow shown in the symbolic representation of rate sensor assembly 50 represents translational drive direction 64. As discussed above, the sense mass of rate sensor assembly 50 is configured to sense angular rate about Z-axis 28 via a Coriolis force, as discussed above. Accordingly, rate sensor assembly 50 will be referred to hereinafter as Z sensor assembly 50. Again, it should be readily understood that rate sensor assembly 50 represents any of a variety of rate sensor designs, each of which may be optimized to sense angular rate occurring about Z-axis 28 while being driven in translational drive direction 64. Furthermore, translational drive direction 64 may be oriented parallel to Y-axis 26, as shown, or parallel to X-axis 24. In other words, the arrow 64 shown in FIG. 6 represents the oscillatory translational drive motion parallel to Y-axis 26. However, rate sensor assembly 50 may be oriented orthogonal to that shown. In such an embodiment, translational drive motion 64 would be parallel to X-axis 24 and sense mass 56 would be constrained for in-plane oscillatory translational motion parallel to Y-axis 26 in response to input angular rotation about the same input axis, i.e., Z-axis 28.

In accordance with embodiments discussed below, X-Y sensor assembly 20 (FIG. 1) and Z sensor assembly 50 are interconnected using suitable coupling spring designs to form a multiple axis rate sensor device, where the configurations of the coupling springs dictate a drive direction (e.g., rotational drive direction 43 or translational drive direction 64) for each of the rate sensor assemblies. Furthermore, the coupling springs allow the various rate sensor assemblies 20, 50 of the multiple axis sensing device to be driven to oscillate at the same drive frequency and with synchronized motion to enable common demodulation in the ASIC. FIGS. 7-10 herein illustrate various coupling spring designs that may be implemented to link multiple rate sensor assemblies to form a multiple axis MEMS device.

Referring now to FIG. 7, FIG. 7 shows a coupling spring structure 80 for coupling a pair of rate sensor assemblies 20 in accordance with an embodiment. Coupling spring structure 80 includes a pair of coupling springs 82, where each of coupling springs 82 is flexible, i.e., compliant, relative to a first axis, and largely non-flexible, i.e., stiff, relative to a second axis. In the particular orientation shown in FIG. 7, the respective folds of each of coupling springs 82 allow coupling springs 82 to expand and contract substantially parallel to Y-axis 26. However, the configuration of the respective folds of coupling springs 82 generally prevent coupling springs 82 from expanding and contracting parallel to X-axis 24.

FIG. 7 further shows X-Y rate sensor assemblies 20 disposed beside one another with coupling spring structure 80 interconnecting them. In particular, an edge 84 of one of X-Y rate sensor assemblies 20, referred to for clarity as X-Y rate sensor assembly 20A, is adjacent to, but not in contact with, an edge 86 of the other X-Y rate sensor assembly 20, referred to for clarity as X-Y rate sensor assembly 20B. An end 88 of one of coupling springs 82 is coupled to each end of edge 84 of X-Y rate sensor assembly 20A, and the opposing end 90 of the same coupling spring 82 is coupled to each end of edge 86 of X-Y rate sensor assembly 20B.

Accordingly, in an embodiment, the entirety of both coupling springs 82 are sandwiched between X-Y rate sensor assemblies 20A and 20B.

The dual coupling spring configuration of coupling spring structure 80 and the compliance of coupling springs 82 relative to Y-direction, but not in X-direction, constrains oscillation of X-Y rate sensor assemblies 20A and 20B to anti-phase motion. That is, when X-Y rate sensor assemblies 20A and 20B are driven in rotational drive direction 43 about Z-axis 28, they oscillate in opposing directions, i.e., anti-phase (represented by oppositely pointing arrows 43) and are synchronized in drive frequency. The configuration of X-Y rate sensor assemblies 20A and 20B and coupling spring structure 80 may be oriented orthogonal to that shown in FIG. 7 so that coupling springs 82 are compliant relative to X-axis 24 and are stiff relative to Y-axis 26. Nevertheless, the dual coupling spring configuration of coupling spring structure 80 would constrain oscillation of X-Y rate sensor assemblies 20A and 20B to anti-phase motion in rotational drive direction 43. Either of X-Y rate sensor assemblies 20A and 20B may be configured to sense input angular rate about either X-axis 24 or Y-axis 26 depending upon the orientation of sense mass 34, as discussed above in connection with FIGS. 1-3.

FIG. 8 shows a coupling spring structure 92 for coupling a pair of rate sensor assemblies 20 in accordance with another embodiment. Coupling spring structure 92 includes a pair of coupling springs 94, where each of coupling springs 94 is flexible, i.e., compliant relative to a first axis, and largely non-compliant, i.e., stiff, relative to a second axis. In the particular orientation shown in FIG. 8, the respective folds of each of coupling springs 94 allow coupling springs 94 to expand and contract substantially parallel to X-axis 24. However, the configuration of the respective folds of coupling springs 94 generally prevent coupling springs 94 from expanding and contracting parallel to Y-axis 26.

FIG. 8 further shows X-Y rate sensor assemblies 20 disposed beside one another with coupling spring structure 92 interconnecting them. In particular, an edge 96 of one of X-Y rate sensor assemblies 20, referred to for clarity as X-Y rate sensor assembly 20A, is adjacent to, but not in contact with, an edge 98 of the other X-Y rate sensor assembly 20, referred to for clarity as X-Y rate sensor assembly 20B. An end 100 of one of coupling springs 94 is coupled to each end of edge 96 of X-Y rate sensor assembly 20A, and the opposing end 102 of the same coupling spring 94 is coupled to each end of edge 98 of X-Y rate sensor assembly 20B. In this embodiment, the entirety of both coupling springs 94 are not sandwiched between X-Y rate sensor assemblies 20A and 20B. Instead they are located exterior to the space between X-Y rate sensor assemblies 20A and 20B.

The dual coupling spring configuration of coupling spring structure 92 and the compliance of coupling springs 94 relative to X-direction, but not in Y-direction, constrains oscillation of X-Y rate sensor assemblies 20A and 20B to in-phase motion, represented by arrows 44 oriented in the same direction. That is, when X-Y rate sensor assemblies 20A and 20B are driven in rotational drive direction 43 about Z-axis 28, they oscillate in the same direction and are synchronized in drive frequency. Again, the configuration of X-Y rate sensor assemblies 20A and 20B and coupling spring structure 92 may be oriented orthogonal to that shown in FIG. 8 so that coupling springs 94 are compliant relative to Y-axis 26 and are stiff relative to X-axis 24. Nevertheless, the dual coupling spring configuration of coupling spring structure 92 would constrain oscillation of X-Y rate sensor assemblies 20A and 20B to in-phase motion in rotational drive direction 43. Furthermore, either of X-Y rate sensor assemblies 20A and 20B may be configured to sense input angular rate about either X-axis 24 or Y-axis 26 depending upon the orientation of sense mass 34, as discussed above in connection with FIGS. 1-3.

FIG. 9 shows another coupling spring structure 104 for coupling a pair of rate sensor assemblies 20, 50 in accordance with an embodiment. In this embodiment, coupling spring structure 104 includes a single coupling spring 106. Coupling spring 106 is flexible, i.e., compliant, relative to a first axis, and largely non-compliant, i.e., stiff, relative to a second axis. In the particular orientation shown in FIG. 9, the folds of coupling spring 106 allows coupling spring 106 to expand and contract substantially parallel to Y-axis 26. However, the configuration of coupling spring 106 generally prevents coupling spring 106 from expanding and contracting parallel to X-axis 24.

FIG. 9 further shows X-Y rate sensor assembly 20 and Z-rate sensor assembly 50 disposed beside one another with coupling spring structure 104 interconnecting them. In particular, an edge 108 of X-Y rate sensor assembly 20 is adjacent to, but not in contact with, an edge 110 of Z rate sensor assembly 50. An end 112 of coupling spring 106 is coupled to an the end of edge 108 of X-Y rate sensor assembly 20, and the opposing end 114 of coupling spring 106 is coupled to the end of edge 110 of Z rate sensor assembly 50. That is, coupling spring 106 is attached to each of rate sensor assemblies 20, 50 offset from a midline 116 of each of rate sensor assemblies 20, 50.

The single coupling spring configuration of coupling spring structure 104, the offset connection of coupling spring with each of rate sensor assemblies 20, 50, and the compliance of coupling spring 106 relative to one direction (e.g., Y-direction) but not in an opposing direction (e.g., X-direction) facilitates oscillatory drive motion of X-Y rate sensor assembly 20 in rotational drive direction 43, while concurrently facilitating oscillatory drive motion of Z-rate sensor assembly 50 in translational drive direction 64. Furthermore, through their connection via coupling spring structure 104, X-Y rate sensor assembly 20 and Z-rate sensor assembly 50 undergo synchronized motion at a single drive frequency. It should be understood that the configuration of rate sensor assemblies 20 and 50, and coupling spring structure 104 can be oriented orthogonal to that shown.

FIG. 10 shows yet another coupling spring structure 120 for coupling a pair of rate sensor assemblies (shown in dashed line form) in accordance with an embodiment. Spring structure 120 generally includes a first spring element 122, a second spring element 124, and a pivot lever 126. An end 128 of first spring element 122 is coupled to pivot lever 126, and an opposing end 130 of first spring element 122 is configured to interconnect with one of rate sensor assemblies 20, 50. Likewise, an end 132 of second spring element 124 is coupled to pivot lever 126, and an opposing end 134 is configured to interconnect with another one of rate sensor assemblies 20, 50.

It will become apparent in discussion associated with FIGS. 12, 13, 15, and 16 that coupling spring structure 120 may be adapted to interconnect X-Y rate sensor assemblies 20, Z-rate sensor assemblies 50, or an X-Y rate sensor assembly 20 with a Z-rate sensor assembly 50. Accordingly, rate sensor assemblies 20, 50 are generally shown represented in FIG. 10 in dashed line form to signify that coupling spring structure 120 may be adapted to interconnect any of rate sensor assemblies 20, 50.

In an embodiment, pivot lever 126 includes an anchor 136 attached to an underlying substrate (not shown), a frame 138 surrounding anchor 136, and arms 140, 142 extending from opposing sides of frame 138. Flexible support elements in the form of torsion springs 144 are coupled to an inner perimeter of frame 138. Torsion springs 144 connect frame 138 and arms 140, 142 to the underlying substrate via anchor 136 so that pivot lever 126 is largely suspended above the substrate. Torsion springs 144 are flexible primarily in X-Y plane 22 so that pivot lever 126 is largely constrained for in-plane oscillatory torsional rotation about a pivot axis, i.e., Z-axis 28, centered at anchor 136. The oscillatory rotational motion of pivot lever 126 about the pivot axis is represented by a curved arrow 146.

First and second spring elements 122, 124 are flexible, i.e., compliant, relative to a first axis, and largely non-flexible, i.e., non-compliant, relative to a second axis. In the particular orientation sown in FIG. 10, the respective folds of each of spring elements 122, 124 allow spring elements 122, 124 to expand and contract substantially parallel to Y-axis 26. However, the configuration of the respective folds of spring elements 122, 124 generally prevent spring elements 106, 108 from expanding and contracting parallel to X-axis 24. It should be understood that the configuration illustrated in FIG. 10 may be oriented orthogonal to that which is shown.

Coupling spring structures 80 (FIG. 7), 92 (FIG. 8), 104 (FIG. 9), and 120 (FIG. 10) are selectively implemented to interconnect various individual rate sensor assemblies 20, 50. Coupling spring structures 80, 92, 104, and 120 enable oscillation of the interconnected rate sensor assemblies 20, 50 at a single drive frequency in a drive direction (e.g., rotational drive direction 43 and/or translational drive direction 64) dictated by the particular coupling spring structures 80, 92, 104, and 120 and their particular compliance, i.e., flexibility. Furthermore, the interconnection of rate sensor assemblies 20, 50 via any of coupling spring structures 80, 92, 104, and 120 results in synchronized oscillation of all of the assemblies 20, 50 to limit sense signal inaccuracies.

In general, various embodiments entail a MEMS device that includes a substrate having a planar surface and at least two rate sensors in spaced part relationship with the substrate. The rate sensors are configured to oscillate parallel to the planar surface of the substrate. The MEMS device further includes drive elements in communication with at least one of the rate sensors for providing a drive signal that exhibits a drive frequency. At least one coupling spring (e.g., coupling spring structures 80, 92, 104, and 120) interconnects the rate sensors. The coupling spring(s) enable oscillation of the rate sensors at the drive frequency in a drive direction dictated by the configuration of the coupling spring(s). The drive direction for at least one of the rate sensors is a first drive direction associated with a first axis and the drive direction for another one of the rate sensors is a second drive direction associated with a second axis, where the second axis is perpendicular to the first axis. The rate sensors may be driven in anti-phase or in-phase. In the following examples, anti-phase motion is symbolized by oppositely directed pairs of arrows 43 or 64, and in-phase motion is exemplified by similarly directed pairs of arrows 43 or 64.

FIGS. 11-16 described below set forth a variety of MEMS multiple axis rate sensor device configurations for illustrative purposes. It will become readily apparent that coupling spring structures 80, 92, 104, and 120 may be adapted to produce a wide variety of multiple axis rate sensor devices, other than the example embodiments described below. Furthermore, the multiple axis rate sensor device configurations need not be limited to four rate sensor assemblies as FIGS. 11-16 will reveal below. Rather, more rate sensor assemblies may be incorporated into a multiple axis rate sensor devices.

Figure 11:
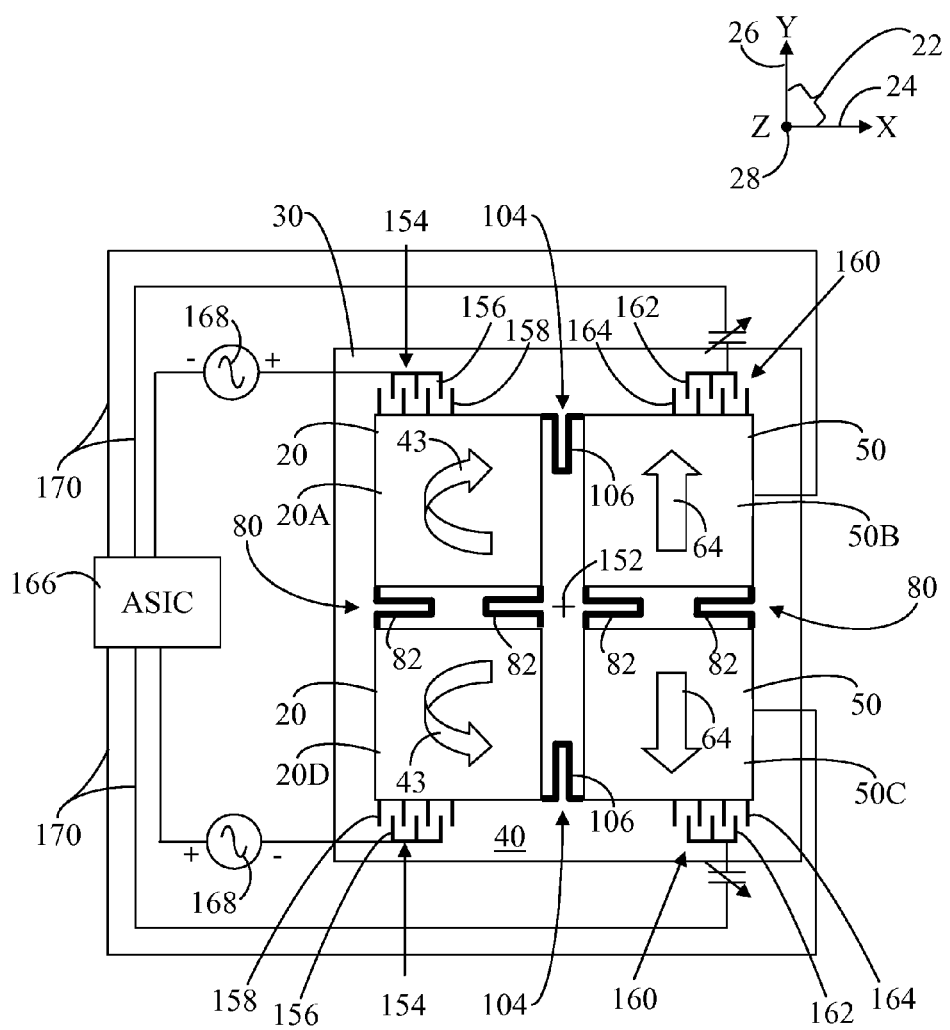
FIG. 11 shows a microelectromechanical systems (MEMS) device in accordance with an example embodiment.

FIG. 11 shows a MEMS device 150 in accordance with an example embodiment. MEMS device 150 includes a pair of X-Y rate sensor assemblies 20 and a pair of Z rate sensor assemblies 50. More particularly, MEMS device 150 includes a first rate sensor assembly, referred to herein as X-Y rate sensor 20A, a second rate sensor assembly, referred to herein as Z rate sensor 50B, a third rate sensor assembly, referred to herein as Z rate sensor 50C, and a fourth rate sensor assembly, referred to herein as X-Y rate sensor 20D. The terms "first," "second," "third," "fourth," and so forth used herein do not refer to an ordering or prioritization of elements within a countable series of elements. Rather, the terms "first," "second," "third," and "fourth," are used to distinguish the particular elements for clarity of discussion.

In various embodiments, both of X-Y rate sensors 20A and 20D may be arranged to sense angular input about X-axis 24, both of X-Y rate sensors 20A and 20D may be arranged to sense angular input about Y-axis 26, or X-Y rate sensor 20A may be arranged to sense angular input about X-axis 24 and X-Y rate sensor 20D may be arranged to sense angular input about Y-axis 26, as discussed in connection with FIGS. 1-3. Accordingly, MEMS device 150 may be configured as a dual axis MEMS rate sensor device or a tri-axis MEMS rate sensor device.

X-Y rate sensor 20A, Z rate sensor 50B, Z rate sensor 50C, and X-Y rate sensor 20D are in spaced apart relationship with an underlying substrate 30. Additionally, X-Y rate sensor 20A, Z rate sensor 50B, Z rate sensor 50C, and X-Y rate sensor 20D are arranged around a central location 152 of substrate 30. Central location 152 does not necessarily refer to a center of substrate 30 equidistant from each outer edge of substrate 30. Rather, central location 152 generally refers to a position on substrate 30 around which each of X-Y rate sensor 20A, Z rate sensor 50B, Z rate sensor 50C, and X-Y rate sensor 20D are laterally spaced at approximately equal distances away from the position.

X-Y rate sensor 20A and Z rate sensor 50B are disposed beside one another and are interconnected via the single spring configuration of coupling spring structure 104. Z-rate sensor 50B and Z rate sensor 50C are disposed beside one another and are interconnected via the dual spring configuration of coupling spring structure 80. Z rate sensor 50C and X-Y rate sensor 20D are disposed beside one another and are interconnected via another coupling spring structure 104. And, X-Y rate sensor 20D and X-Y rate sensor 20A are disposed beside one another and are interconnected via another coupling spring structure 80.

In the arrangement shown in FIG. 11, coupling springs 106 of coupling spring structures 104 are suitably oriented in X-Y plane 22 to be compliant, i.e., flexible, in a direction parallel to X-axis 24 and stiff in a direction parallel to Y-axis 26. Coupling springs 82 of coupling spring structures 80 are suitably oriented in X-Y plane 22 to be compliant in a direction parallel to Y-axis 26 and stiff in a direction parallel to X-axis 24.

MEMS device 150 further includes a drive system for driving respective drive masses 32 (FIG. 1) and 54 (FIG. 4) of X-Y rate sensors 20A, 20D and Z rate sensors 50B, 50C. In the illustrated embodiment, the drive system includes two drive actuator units 154 having fixed drive elements 156 and movable drive elements 158. Fixed drive elements 156 may be coupled with substrate 30 and movable drive elements 158 may be attached to drive masses 32 (FIG. 1) of X-Y rate sensors 20A and 20D. Fixed drive elements 156 are spaced apart from and positioned in alternating arrangement with movable drive elements 158. By virtue of their attachment to drive masses 32 of X-Y rate sensors 20A and 20D, movable drive elements 158 are movable together with drive masses 32. Conversely, due to their fixed attachment to substrate 30, fixed drive elements 156 are stationary relative to movable drive elements 158. Only a few fixed and movable drive elements 156 and 158 are shown for clarity of illustration. Those skilled in the art should readily recognize that the quantity and structure of the fixed and movable drive elements will vary in accordance with design requirements.

The drive system of MEMS device 150 may further include drive monitor units 160 for monitoring movement of the drive masses. In the illustrated embodiment, drive monitor units 160 include fixed monitor elements 162 and movable monitor elements 164. Fixed monitor elements 162 are coupled with substrate 30 and, in an embodiment, movable monitor elements 164 are attached to drive masses 54 (FIG. 4) of Z rate sensors 50B and 50C. Fixed monitor elements 162 are spaced apart from and positioned in alternating arrangement with movable monitor elements 164. By virtue of their attachment to drive masses 54 of Z rate sensors 50B and 50C, movable monitor elements 164 are movable together with drive masses 54. Conversely, due to their fixed attachment to substrate 30, fixed monitor elements 162 are stationary relative to movable drive elements 164. Again, only a few fixed and movable monitor elements 162 and 164 are shown for clarity of illustration. Those skilled in the art should readily recognize that the quantity and structure of the fixed and movable monitor elements can vary in accordance with design requirements. Alternatively, some system designs may not call for the inclusion of drive monitor units 160.

In general, an application specific integrated circuit (ASIC) 166 supplies a drive signal 168 to drive actuator units 154. Drive signal 168 is a waveform (typically a sine wave) having a drive frequency. Typically, ASIC 166 adjust the drive frequency of drive signal 168 such that drive occurs at it the resonant frequency of the MEMS device. In some embodiments, this may be done with a Phase Lock Loop (PLL) system (not shown). In the illustrated example, the application of drive signal 168 via drive actuator units 154 causes drive masses 32 for each of X-Y rate sensor assemblies 20A and 20D to oscillate in rotational drive direction 43 at the drive frequency of drive signal 168. In addition, drive masses 54 for each of Z-rate sensor assemblies 50B and 50C will oscillate in translational drive direction 64 at the drive frequency of drive signal 168 due to their interconnection with X-Y rate sensor assemblies 20A and 20D via coupling spring structures 104. ASIC 166 receives monitor signals 170 from drive monitor units 160 in response to the application of drive signal 168 to rate sensor assemblies 20A, 50B, 50C, and 20D. Monitor signals 170 are used by ASIC 166 to monitor drive displacement and phase of drive masses 32 and 54.

In the illustrated example, two drive actuator units 154 are utilized to drive the four rate sensor assemblies 20A, 50B, 50C, and 20D. This type of configuration may achieve space efficiency. In other embodiments, however, additional drive actuator units 154 may be implemented, with one or more drive actuator units 154 per rate sensor assembly. For example, in this example, two drive actuator units 154 may be implemented with two drive actuator units 154 per rate sensor assembly. Drive actuator units 154 represent a wide variety of drive system configurations and techniques. Nevertheless, in the various embodiments, the drive system would supply the same drive signal at a particular drive frequency to all drive actuation units.

Due to the interconnection of X-Y rate sensors 20A and 20D via coupling spring structure 80, the drive masses 32 of X-Y rate sensors 20A and 20D will oscillate in anti-phase relative to one another at the drive frequency. Similarly, due to the interconnection of Z rate sensors 50C and 50D via another coupling spring structure 80, the drive masses 32 of X-Y rate sensors 20A and 20D will also oscillate in anti-phase relative to one another also at the drive frequency. The anti-phase motion is represented by oppositely directed pairs of arrows 43 and 64. The interconnection of X-Y rate sensor 20A and Z rate sensor 50B via coupling spring structure 104, as well as the interconnection of X-Y rate sensor 20D and Z rate sensor 50C via another coupling spring structure 104, forces the rejection of a linear acceleration component. That is, under linear acceleration in a direction parallel to X-axis 24 and/or in a direction parallel to Y-axis 26, the system is balanced so that it should not respond to an acceleration component.

Figure 12:
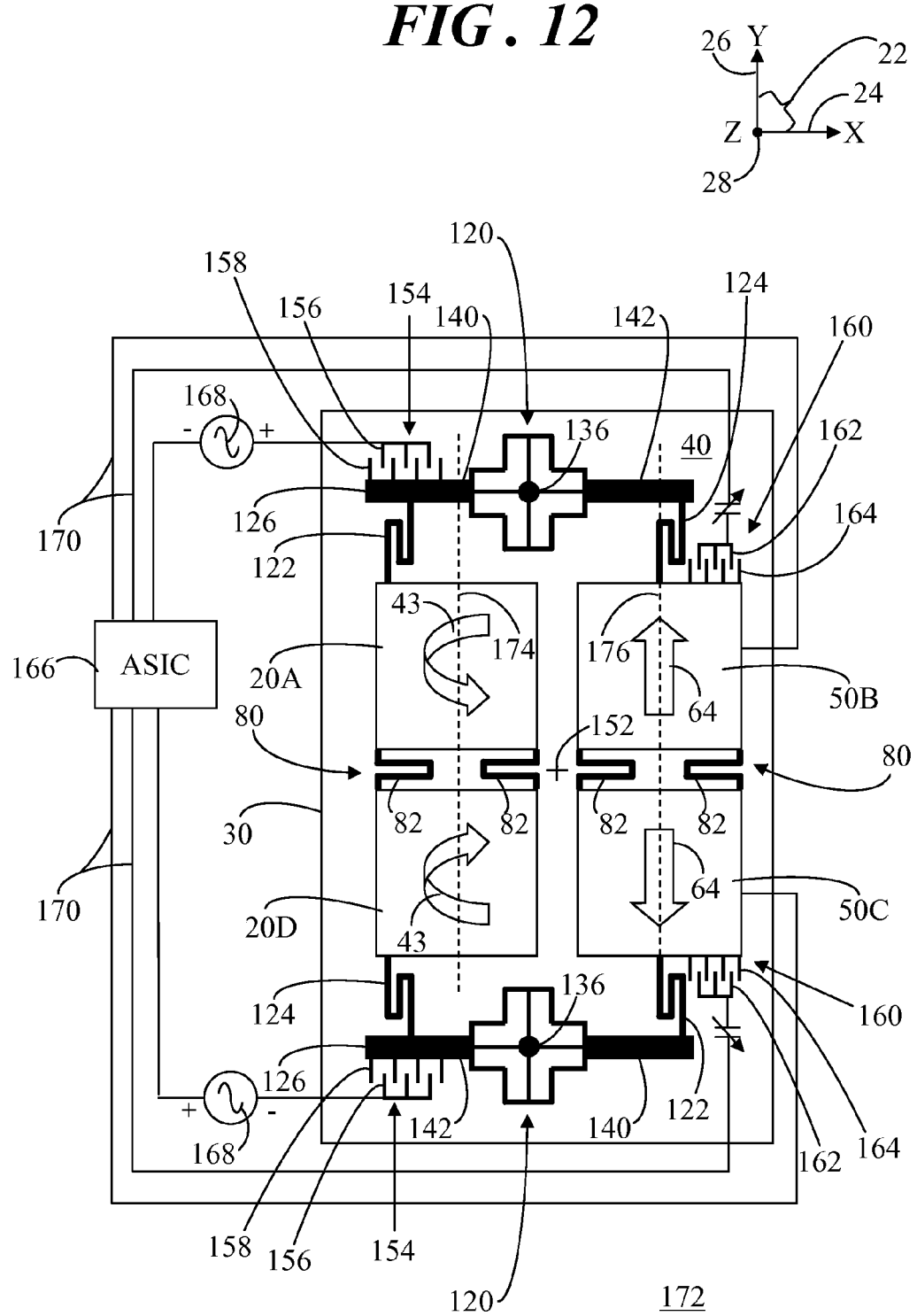
FIG. 12 shows a MEMS device in accordance with an example embodiment.

FIG. 12 shows a MEMS device 172 in accordance with an example embodiment. MEMS device 172 is similar to MEMS device 150 in that it includes X-Y rate sensor 20A, Z rate sensor 50B, Z rate sensor 50C, and X-Y rate sensor 20D in spaced apart relationship with an underlying substrate 30, which are arranged around central location 152 of substrate 30. X-Y rate sensor 20A and Z rate sensor 50B are interconnected via the pivot lever spring configuration of coupling spring structure 120. Z-rate sensor 50B and Z rate sensor 50C are interconnected via the dual spring configuration of coupling spring structure 80. Z rate sensor 50C and X-Y rate sensor 20D are interconnected via another coupling spring structure 120. And, X-Y rate sensor 20D and X-Y rate sensor 20A are interconnected via another coupling spring structure 80.

In various embodiments, both of X-Y rate sensors 20A and 20D may be arranged to sense angular input about X-axis 24, both of X-Y rate sensors 20A and 20D may be arranged to sense angular input about Y-axis 26, or X-Y rate sensor 20A may be arranged to sense angular input about X-axis 24 and X-Y rate sensor 20D may be arranged to sense angular input about Y-axis 26, as discussed in connection with FIGS. 1-3. Accordingly, MEMS device 172 may be configured as a dual axis MEMS rate sensor device or a tri-axis MEMS rate sensor device.

In the arrangement shown in FIG. 12, first and second spring elements 122 and 124 of coupling spring structures 120 are suitably oriented in X-Y plane 22 to be compliant, i.e., flexible, in a direction parallel to X-axis 24 and non-compliant, i.e., stiff, in a direction parallel to Y-axis 26. Coupling springs 82 of coupling spring structures 80 are suitably oriented in X-Y plane 22 to be compliant in a direction parallel to Y-axis 26 and non-compliant, i.e., stiff, in a direction parallel to X-axis 24.

Like MEMS device 150, MEMS device 172 further includes drive actuator units 154 having fixed drive elements 156 and movable drive elements 158. In the illustrated embodiment, fixed drive elements 156 may be coupled with substrate 30 and movable drive elements 158 may be attached to pivot levers 126 of each coupling spring structure 120. By virtue of their attachment to pivot levers 126, movable drive elements 158 are movable together with pivot levers 126. Conversely, due to their fixed attachment to substrate 30, fixed drive elements 156 are stationary relative to movable drive elements 158. Like MEMS device 150, MEMS device 172 further includes drive monitor units 160 having fixed monitor elements 162 and movable monitor elements 164, as discussed above.

In general, ASIC 166 supplies drive signal 168 having a predetermined drive frequency to drive actuator units 154. In the illustrated example, the application of drive signal 168 via drive actuator units 154 causes pivot levers 126 of coupling spring structures 120 to pivot about their respective pivot axes centered at anchors 136 in anti-phase. The movement of pivot levers 126 causes drive masses 32 (FIG. 1) for each of X-Y rate sensor assemblies 20A and 20D to oscillate in rotational drive direction 43 at the drive frequency of drive signal 168. Likewise, drive masses 54 (FIG. 4) for each of Z-rate sensor assemblies 50B and 50C will oscillate in translational drive direction 64 at the drive frequency of drive signal 168 due to their interconnection with X-Y rate sensor assemblies 20A and 20D via coupling spring structures 120.

Due to the interconnection of X-Y rate sensors 20A and 20D via coupling spring structure 80, the drive masses 32 of X-Y rate sensors 20A and 20D will oscillate in anti-phase relative to one another at the drive frequency. Similarly, due to the interconnection of Z rate sensors 50C and 50D via another coupling spring structure 80, the drive masses 32 of X-Y rate sensors 20A and 20D will also oscillate in anti-phase relative to one another also at the drive frequency. The interconnection of X-Y rate sensor 20A and Z rate sensor 50B via coupling spring structure 120, as well as the interconnection of X-Y rate sensor 20D and Z rate sensor 50C via another coupling spring structure 120 forces the rejection of a linear acceleration component.

As shown in connection with MEMS device 172, first spring element 122 of an associated one of the coupling spring structures 120 is coupled to arm 140 of pivot lever 126 and to X-Y rate sensor 20A. Second spring element 124 of the same coupling spring structure 120 is coupled to arm 142 of pivot lever 126 and to Z-rate sensor 50B. Similarly, second spring element 124 of the other one of coupling spring structures 120 is coupled to arm 142 of pivot lever 126 and to X-Y rate sensor 20D, and first spring element 122 of the same coupling spring structure 120 is coupled to arm 140 of pivot lever 126 and to Z rate sensor 50B.

Each of X-Y rate sensors 20A and 20D exhibits a midline 174, and each of Z rate sensors 50B and 50C also exhibits a midline 176. In an embodiment, first spring element 122 is coupled to X-Y rate sensor 20A offset from midline 174 and second spring element 124 is coupled to Z rate sensor 50B along, or at, midline 176. Likewise, second spring element 124 is coupled to X-Y rate sensor 20D offset from midline 174 and first spring element 122 is coupled to Z rate sensor 50C along, or at, midline 176. The offset attachment of spring elements 122 and 124 relative to midline 174 results in movement of drive masses 32 (FIG. 1) of X-Y rate sensors 20A and 20D in rotational drive direction 43. Furthermore, the midline attachment of spring elements 124 and 122 relative to midline 176 results in movement of drive masses 54 (FIG. 4) of Z rate sensors 50B and 50C in translational drive direction 64.

Additionally, a ratio of the movement of drive masses 32 of X-Y rate sensors 20A and 20D in rotational drive direction 43 relative to the movement of drive masses 54 (FIG. 4) of Z rate sensors 50B and 50C in translational drive direction 64 can be adjusted by suitable placement of the link springs, e.g., first spring element 122 attached to X-Y rate sensor 20A and second spring element 124 attached to X-Y rate sensor 20D.

FIGS. 13-16 provide additional examples of MEMS multi-axis rate sensor devices. In the following illustrations, drive actuator units 154, drive monitor units 160, ASIC 166, and drive signal 168 are not illustrated for simplicity. It should be understood, however, that these elements can be readily implemented in connection with the following provided MEMS device examples. Additionally, each of the following illustrations show two X-Y rate sensor assemblies 20. In various embodiments, both of X-Y rate sensor assemblies 20 may be oriented to sense angular input about the same axis (e.g., X-axis 24 or Y-axis 26) to produce a dual axis rate sensor. Alternatively X-Y rate sensor assemblies may be suitably oriented so that each of X-Y rate sensor assemblies 20 sense angular input about different axes (e.g., X-axis 24 and Y-axis 26) to produce a tri-axis rate sensor.

Figure 13:
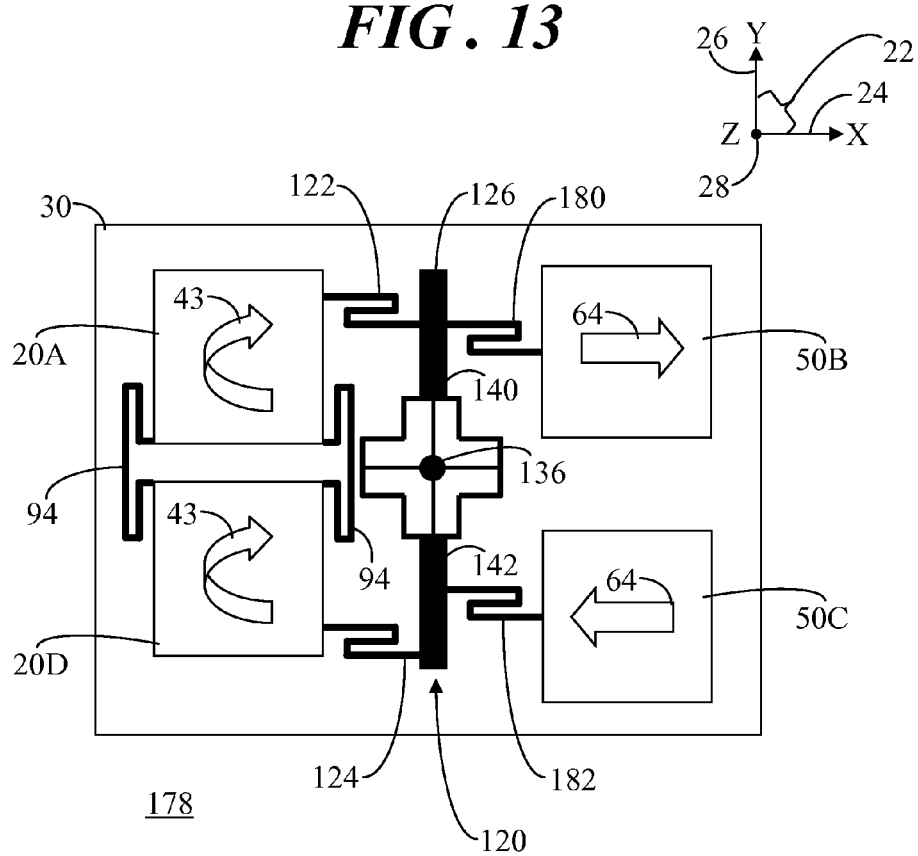
FIG. 13 shows a MEMS device in accordance with an example embodiment.

FIG. 13 shows a MEMS device 178 in accordance with an example embodiment. MEMS device 178 includes X-Y rate sensor 20A, Z rate sensor 50B, Z rate sensor 50C, and X-Y rate sensor 20D in spaced apart relationship with an underlying substrate 30. A coupling spring structure 120 is located between each pair or rate sensor assemblies. As such, coupling spring structure 120 is located between a pair of rate sensor assemblies that includes X-Y rate sensors 20A and 20D, and the other pair of rate sensor assemblies that includes Z rate sensors 50B and 50C.

X-Y rate sensor 20A and Z rate sensor 50B are interconnected via the pivot lever spring configuration of coupling spring structure 120. In particular, coupling spring structure 120 further includes a third spring element 180 coupled to each of arm 140 and Z rate sensor 50B. Hence, X-Y rate sensor 20A and Z rate sensor 50B are coupled by way of first spring element 122, pivot lever 126, and third spring element 180. Z-rate sensor 50B and Z rate sensor 50C are also interconnected via the pivot lever spring configuration of coupling spring structure 120. In particular, coupling spring structure 120 further includes a fourth spring element 182 coupled to each of arm 142 of pivot lever 126 and Z rate sensor 50C. Hence, Z-rate sensors 50B and 50C are coupled by way of third spring element 180, pivot lever 126, and fourth spring element 182. Z rate sensor 50C and X-Y rate sensor 20D are interconnected via the pivot lever spring configuration of coupling spring structure 120. In particular, Z rate sensor 50C and X-Y rate sensor 20D are coupled by way of fourth spring element 182, pivot lever 126, and second spring element 124. And finally, X-Y rate sensor 20D and X-Y rate sensor 20A are interconnected via coupling spring structure 82.

First, second, third, and fourth spring elements 122, 128, 180, and 182 are compliant in a direction parallel to Y-axis 26, and non-compliant, i.e., stiff, in a direction parallel to X-axis 24. Springs 94 of coupling spring structure 82 are compliant in a direction parallel to X-axis 24, and non-compliant, i.e., stiff, in a direction parallel to Y-axis 26. When actuated by the drive system (not shown), the pivotal motion of pivot lever 126 about a pivot axis centered at anchor 136, and the compliance of spring elements 122, 124, 180, and 182 parallel to Y-axis 26 cause drive masses 54 (FIG. 4) of Z rate sensors 50B and 50C to undergo motion in translational drive direction 64. In addition, when actuated by the drive system, the pivotal motion of pivot lever 126 and the compliance of coupling springs 94 in a direction parallel to X-axis 24 causes X-Y rate sensors 20A and 20D to undergo motion in rotational drive direction 43.

Translational drive direction 64 of Z rate sensors 50B and 50C is perpendicular to the compliance of spring elements 122, 128, 180, and 182. Thus, translational drive direction 64 will be in a direction parallel to X-axis 24. The pivot lever configuration of coupling spring structure 120 causes Z rate sensors 50B and 50C to oscillate at the same drive frequency, but in anti-phase relative to one another. However, the dual spring configuration of coupling spring structure 82 and the compliance of coupling springs 94 in a direction parallel to X-axis 24 causes X-Y rate sensors 20A and 20D to oscillate at the same drive frequency, and in-phase relative to one another.

Figure 14:
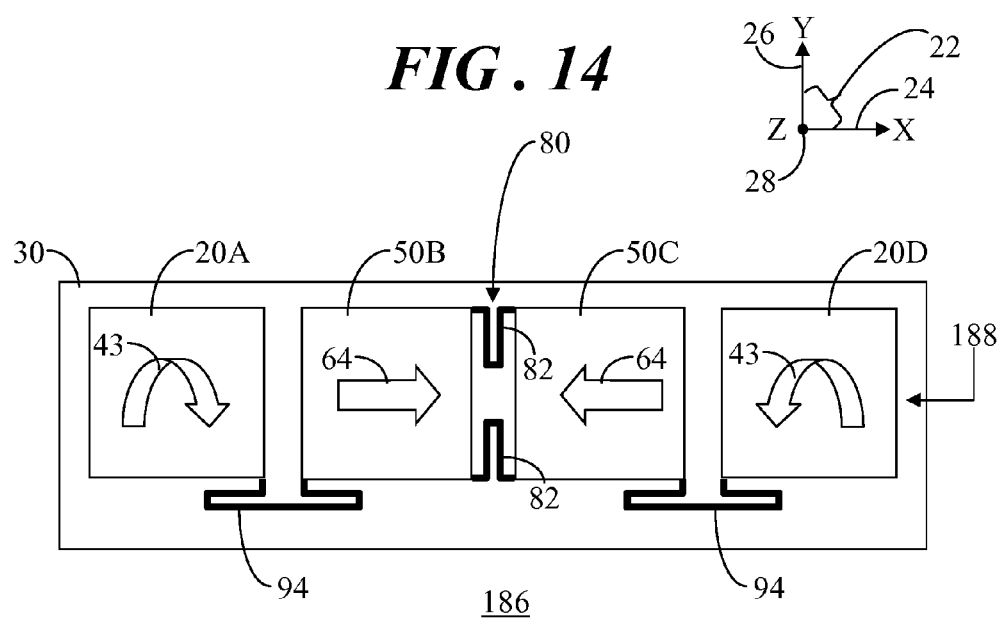
FIG. 14 shows a MEMS device in accordance with an example embodiment.

FIG. 14 shows a MEMS device 186 in accordance with an example embodiment. MEMS device 186 includes X-Y rate sensor 20A, Z rate sensor 50B, Z rate sensor 50C, and X-Y rate sensor 20D in spaced apart relationship with an underlying substrate 30. However, unlike previous embodiments, X-Y rate sensor 20A, Z rate sensor 50B, Z rate sensor 50C, and X-Y rate sensor 20D of MEMS device 186 are arranged in a single row 188. That is, Z rate sensor 50B is disposed beside X-Y rate sensor 20A, Z rate sensor 50C is disposed beside Z rate sensor 50B, and X-Y rate sensor 20D is disposed beside Z rate sensor 50C.

In this illustrated embodiment, a single one of coupling springs 94 from coupling spring structure 82 (FIG. 8) interconnects X-Y rate sensor 20A and Z rate sensor 50B. Z rate sensor 50B and Z rate sensor 50C are interconnected via the dual spring configuration of coupling spring structure 80. Z rate sensor 50C and X-Y rate sensor 20D are interconnected via a single one of coupling springs 94 from coupling spring structure 82. Since X-Y rate sensor 20A, Z rate sensor 50B, Z rate sensor 50C, and X-Y rate sensor 20D of MEMS device 186 are arranged in row 188, there is no coupling spring structure interconnecting X-Y rate sensor 20D with X-Y rate sensor 20A.

Coupling springs 94 are oriented to be compliant in a direction parallel to Y-axis 26 and substantially non-compliant, i.e., stiff, in a direction parallel to X-axis 24. Conversely, coupling springs 82 of coupling spring structure 80 are oriented to be compliant in a direction parallel to X-axis 24 and substantially non-compliant, i.e., stiff, in a direction parallel to Y-axis 26. Hence, when actuated by a drive system (not shown), X-Y rate sensors 20A and 20D will oscillate in rotational drive direction 43 at the same drive frequency, but in anti-phase relative to one another. Additionally, when actuated by the drive system, Z rate sensors 50B and 50C will oscillate in translational drive direction 64 at the same drive frequency, but also in anti-phase relative to one another.

Figure 15:
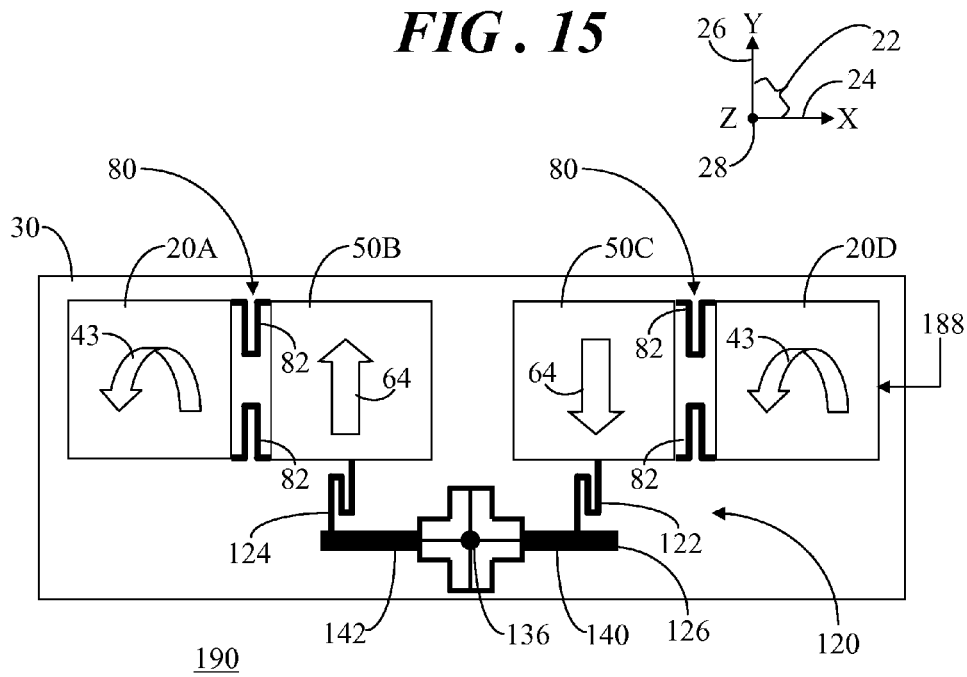
FIG. 15 shows a MEMS device in accordance with an example embodiment.

FIG. 15 shows a MEMS device 188 in accordance with an example embodiment. MEMS device 188 includes X-Y rate sensor 20A, Z rate sensor 50B, Z rate sensor 50C, and X-Y rate sensor 20D in spaced apart relationship with an underlying substrate 30. Additionally, X-Y rate sensor 20A, Z rate sensor 50B, Z rate sensor 50C, and X-Y rate sensor 20D of MEMS device 186 are disposed beside one another and are arranged in row 188.

In this illustrated embodiment, the dual spring configuration of coupling spring structure 80 interconnects X-Y rate sensor 20A and Z rate sensor 50B. Z rate sensor 50B and Z rate sensor 50C are interconnected via the pivot lever configuration of coupling spring structure 120. Z rate sensor 50C and X-Y rate sensor 20D are interconnected via the dual spring configuration of another coupling spring structure 80. Again, since X-Y rate sensor 20A, Z rate sensor 50B, Z rate sensor 50C, and X-Y rate sensor 20D of MEMS device 186 are arranged in row 188, there is no coupling spring structure interconnecting X-Y rate sensor 20D with X-Y rate sensor 20A.

Coupling springs 82 of coupling spring structures 80 are oriented to be compliant in a direction parallel to X-axis 24 and substantially non-compliant, i.e., stiff, in a direction parallel to Y-axis 26. Additionally, first and second spring elements 122 and 124 of coupling spring structure 120 are oriented to be compliant in a direction parallel to X-axis 24 and substantially non-compliant, i.e., stiff, in a direction parallel to Y-axis 26. When actuated by a drive system (not shown), pivoting motion of pivot lever 126 about a pivot axis centered at anchor 136 will cause X-Y rate sensors 20A and 20D to oscillate in rotational drive direction 43 at the same drive frequency, and in-phase relative to one another. Additionally, when actuated by the drive system, Z rate sensors 50B and 50C will oscillate in translational drive direction 64, parallel to Y-axis 26, at the same drive frequency, and in anti-phase relative to one another.

Figure 16:
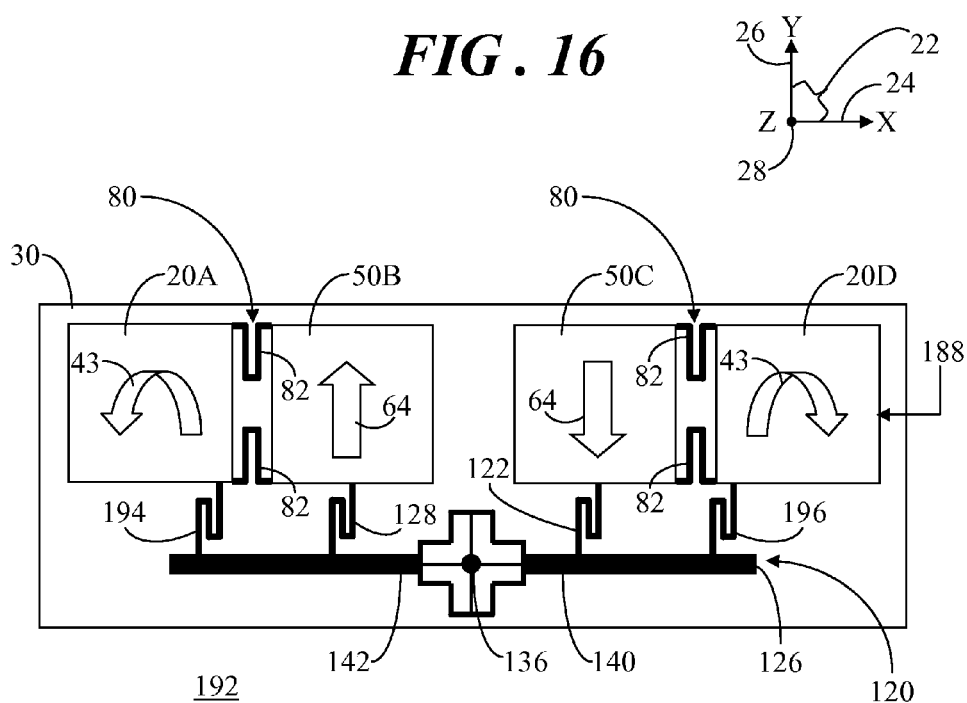
FIG. 16 shows a MEMS device in accordance with an example embodiment.

FIG. 16 shows a MEMS device 192 in accordance with an example embodiment. MEMS device 188 includes X-Y rate sensor 20A, Z rate sensor 50B, Z rate sensor 50C, and X-Y rate sensor 20D in spaced apart relationship with an underlying substrate 30. Additionally, X-Y rate sensor 20A, Z rate sensor 50B, Z rate sensor 50C, and X-Y rate sensor 20D of MEMS device 186 are disposed beside one another and are arranged in row 188.

In this illustrated embodiment, the dual spring configuration of coupling spring structure 80 interconnects X-Y rate sensor 20A and Z rate sensor 50B. Z rate sensor 50B and Z rate sensor 50C are interconnected via the pivot lever configuration of coupling spring structure 120. Z rate sensor 50C and X-Y rate sensor 20D are interconnected via the dual spring configuration of another coupling spring structure 80. Additionally, coupling spring structure 120 includes a third spring element 194 interconnected between X-Y rate sensor 20A and arm 142 of pivot lever 126, and a fourth spring element 196 interconnected between X-Y rate sensor 20D and arm 140 of pivot lever 126.

Coupling springs 82 of coupling spring structures 80 are oriented to be compliant in a direction parallel to X-axis 24 and substantially non-compliant, i.e., stiff, in a direction parallel to Y-axis 26. Additionally, first, second, third, and fourth spring elements 122, 124, 194, 196 of coupling spring structure 120 are oriented to be compliant in a direction parallel to X-axis 24 and substantially non-compliant, i.e., stiff, in a direction parallel to Y-axis 26. When actuated by a drive system (not shown), pivoting motion of pivot lever 126 about a pivot axis centered at anchor 136 will cause X-Y rate sensors 20A and 20D to oscillate in rotational drive direction 43 at the same drive frequency, and in anti-phase relative to one another. Additionally, when actuated by the drive system, Z rate sensors 50B and 50C will oscillate in translational drive direction 64, parallel to Y-axis 26, at the same drive frequency, and in anti-phase relative to one another.

In an embodiment, a MEMS device comprises a substrate having a planar surface, a first rate sensor, and a second rate sensor. The first and second rate sensors are in spaced apart relationship with the substrate, and the first and second rate sensors are configured to oscillate parallel to the planar surface. The MEMS device further comprises drive elements in communication with at least one of the first and second rate sensors for providing a drive signal exhibiting a drive frequency and a first coupling spring interconnecting the first and second rate sensors. The first coupling spring enables oscillation of the first and second rate sensors at the drive frequency in a drive direction dictated by the coupling spring, wherein the drive direction for the first rate sensor is a first drive direction associated with a first axis and the drive direction for the second rate sensor is a second drive direction associated with a second axis, the second axis being perpendicular to the first axis.

In another embodiment, a MEMS device comprises a substrate having a planar surface and a plurality of rate sensors. The rate sensors are in spaced apart relationship with the substrate, and each of the rate sensors is configured to oscillate parallel to the planar surface. The MEMS device further includes drive elements in communication with at least one of the rate sensors for providing a drive signal exhibiting a drive frequency and coupling springs interconnecting the plurality of rate sensors. The coupling springs enable oscillation of each of the plurality of rate sensors at the drive frequency in a drive direction dictated by the coupling springs. The drive direction for a first subset of the rate sensors is a rotational drive direction associated with a first axis that is perpendicular to the surface of the substrate, such that the first subset of the rate sensors is driven into rotational oscillation about the first axis. The drive direction for a second subset of the rate sensors is a translational drive direction associated with a second axis that is parallel to the surface of the substrate, such that the second subset of the rate sensors is driven into translational oscillation parallel to the second axis.

Accordingly, various embodiments entail MEMS device structures that include multiple individual rate sensor assemblies for multiple axis sensing. The rate sensor assemblies are linked together via coupling springs, where the configurations of coupling springs dictate a drive direction for each of the rate sensor assemblies. Additionally, each of the rate sensor assemblies are driven into oscillation at the same drive frequency. The coupling springs enable the rate sensor assemblies to oscillate at the same drive frequency with synchronized motion to enable common demodulation in an associated ASIC. The MEMS device structures including multiple rate sensor assemblies linked together via coupling springs and driven with the same drive signal at the same drive frequency achieve savings in sensor size, complexity, and cost.

While principles of the inventive subject matter have been described above in connection with specific devices, it is to be clearly understood that this description is made only be way of example and not as a limitation on the scope of the inventive subject matter. Further, the phraseology or terminology employed herein is for the purpose of description and not limitation.

The foregoing description of specific embodiments reveals the general nature of the inventive subject matter sufficiently so that other can, by applying current knowledge, readily modify and/or adapt it for various applications without departing from the general concept. Therefore, such adaptations are within the meaning and range of equivalents of the disclosed embodiments. The inventive subject matter embraces all such alternatives, modifications, equivalents, and variations as fall within the spirit and broad scope of the claims.

What is claimed is:

1. A microelectromechanical systems (MEMS) device comprising:
    a first rate sensor;
    a second rate sensor, said first and second rate sensors being configured to oscillate parallel to a planar surface;
    drive elements in communication with at least one of said first and second rate sensors for providing a drive signal exhibiting a drive frequency; and
    a first coupling spring structure interconnecting said first and second rate sensors, said first coupling spring structure enabling oscillation of said first and second rate sensors at said drive frequency in a drive direction dictated by said coupling spring structure, wherein said drive direction for said first rate sensor is a first drive direction associated with a first axis and said drive direction for said second rate sensor is a second drive direction associated with a second axis, said second axis being perpendicular to said first axis; and wherein
    said first axis is perpendicular to said planar surface, said first drive direction is a rotational drive direction such that said first rate sensor is driven in said rotational drive direction about said first axis; and
    said second axis is parallel to said planar surface, said second drive direction is a translational drive direction such that said second rate sensor is driven in said translational drive direction parallel to said second axis.

2. A MEMS device as claimed in claim 1 wherein each of said first and second rate sensors comprises:
    a drive frame having a central opening; and
    a sense mass positioned in said central opening and flexibly coupled to said drive frame, wherein said first coupling spring structure is interconnected with said drive frame of said each of said first and second rate sensors.

3. A MEMS device as claimed in claim 1 wherein
    said first coupling spring structure interconnecting said first and second rate sensors is stiff in said translational drive direction and compliant relative to a third axis that is orthogonal to each of said first and second axes.

4. A MEMS device as claimed in claim 1 further comprising:
    a third rate sensor disposed beside said second rate sensor; and
    a second coupling spring structure interconnecting said second and third rate sensors, said second coupling spring structure enabling oscillation of said third rate sensor at said drive frequency in said drive direction dictated by said second coupling spring structure.

5. A MEMS device as claimed in claim 4 wherein said drive direction for said third rate sensor is said second drive direction, and said second coupling spring structure constrains said oscillation of said second and third rate sensors to anti-phase motion.

6. A MEMS device as claimed in claim 4 further comprising:
    a fourth rate sensor disposed beside said third rate sensor; and
    a third coupling spring structure interconnecting said third and fourth rate sensors, said third coupling spring structure enabling oscillation of said fourth rate sensor at said drive frequency in said drive direction dictated by said third coupling spring structure.

7. A MEMS device as claimed in claim 6 wherein said first, second, third, and fourth rate sensors are arranged in a row.

8. A MEMS device as claimed in claim 6 wherein:
    said first, second, third, and fourth rate sensors are arranged around a central location of said planar surface; and
    said MEMS device further comprises a fourth coupling spring structure interconnected between said first and fourth rate sensors.

9. A MEMS device as claimed in claim 1 wherein said first coupling spring structure comprises:
    a first spring element coupled to said first rate sensor;
    a second spring element coupled to said second rate sensor; and
    a pivot lever having an anchor coupled to said planar surface, said pivot lever being configured to oscillate about a pivot axis centered at said anchor and perpendicular to said planar surface, said first spring element being coupled to said pivot lever, and said second spring element being coupled to said pivot lever.

10. A MEMS device as claimed in claim 9 wherein:
said first rate sensor exhibits a first midline oriented parallel to said planar surface, said first spring element being coupled with said first rate sensor at a location offset from said first midline; and
said second rate sensor exhibits a second midline oriented parallel to said planar surface and parallel to said first midline, said second spring element being coupled with said second rate sensor at a second location along said second midline.

11. A MEMS device as claimed in claim 10 wherein said first and second spring elements are stiff in said translational drive direction and compliant relative to a third axis that is orthogonal to each of said first and second axes.

12. A MEMS device as claimed in claim 1 further comprising:
a third rate sensor disposed beside said second rate sensor; and
a second coupling spring structure interconnecting said second and third rate sensors, said second coupling spring structure enabling oscillation of said third rate sensor at said drive frequency in said drive direction dictated by said second coupling spring structure, said second coupling spring structure including:
a first spring element coupled to said second rate sensor;
a second spring element coupled to said third rate sensor; and
a pivot lever having an anchor coupled to said planar surface, said pivot lever being configured to oscillate about a pivot axis centered at said anchor and perpendicular to said planar surface, said first spring element being coupled to said pivot lever, and said second spring element being coupled to said pivot lever.

13. A MEMS device as claimed in claim 12 wherein said first and second spring elements are stiff in said translational drive direction and compliant relative to a third axis that is orthogonal to each of said first and second axes.

14. A MEMS device as claimed in claim 12 further comprising:
a fourth rate sensor disposed beside said third rate sensor such that said first, second, third, and fourth rate sensors are arranged in a row;
a third coupling spring structure interconnecting said third and fourth rate sensors, said third coupling spring structure enabling oscillation of said fourth rate sensor at said drive frequency in said drive direction dictated by said third coupling spring structure; and
said second coupling spring structure further includes a third spring element and a fourth spring element, said third spring element being coupled to each of said first rate sensor and said pivot lever, and said fourth spring element being coupled to each of said fourth rate sensor and said pivot lever.

15. A microelectromechanical systems (MEMS) device comprising:
a plurality of rate sensors configured to oscillate parallel to a planar surface;
drive elements in communication with at least one of said rate sensors for providing a drive signal exhibiting a drive frequency; and
coupling spring structures interconnecting said plurality of rate sensors, said coupling spring structures enabling oscillation of each of said plurality of rate sensors at said drive frequency in a drive direction dictated by said coupling spring structures, wherein:
said drive direction for a first subset of said rate sensors is a rotational drive direction associated with a first axis that is perpendicular to said planar surface, such that said first subset of said rate sensors is driven into rotational oscillation about said first axis; and
said drive direction for a second subset of said rate sensors is a translational drive direction associated with a second axis that is parallel to said planar surface, such that said second subset of said rate sensors is driven into translational oscillation parallel to said second axis.

16. A MEMS device as claimed in claim 15 wherein said plurality of rate sensors comprises:
a first rate sensor;
a second rate sensor interconnected with said first rate sensor via a first one of said coupling spring structures;
a third rate sensor interconnected with said second rate sensor via a second one of said coupling spring structures; and
a fourth rate sensor interconnected with said third rate sensor via a third one of said coupling spring structures, wherein said first and fourth rate sensors form said first subset of said rate sensors configured to undergo said rotational oscillation and said second and third rate sensors form said second subset of said rate sensors configured to undergo said translational oscillation.

17. A MEMS device as claimed in claim 16 wherein said second one of said coupling spring structures constrains said translational oscillation of said second and third rate sensors to anti-phase motion.

* * * * *